United States Patent
Miyahara et al.

(10) Patent No.: US 10,391,454 B2
(45) Date of Patent: Aug. 27, 2019

(54) MONOLITHIC SEPARATION MEMBRANE STRUCTURE AND METHOD FOR PRODUCING MONOLITHIC SEPARATION MEMBRANE STRUCTURE

(71) Applicant: NGK INSULATORS, LTD., Nagoya-Shi (JP)

(72) Inventors: Makoto Miyahara, Handa (JP); Makiko Ichikawa, Komaki (JP); Hideyuki Suzuki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 181 days.

(21) Appl. No.: 15/260,703

(22) Filed: Sep. 9, 2016

(65) Prior Publication Data
US 2016/0375405 A1    Dec. 29, 2016

Related U.S. Application Data (63) Continuation of application No. PCT/JP2015/054012, filed on Feb. 13, 2015.

(30) Foreign Application Priority Data

Mar. 28, 2014    (JP) ................................ 2014-069301

(51) Int. Cl.
*B01D 69/02*    (2006.01)
*B01D 63/06*    (2006.01)
(Continued)

(52) U.S. Cl.
CPC ....... *B01D 63/066* (2013.01); *B01D 46/2429* (2013.01); *B01D 53/228* (2013.01);
(Continued)

(58) Field of Classification Search
None
See application file for complete search history.

(56) References Cited

U.S. PATENT DOCUMENTS

2005/0172811 A1    8/2005    Oyama et al.
2006/0288677 A1*   12/2006   Kaigawa ............... B01D 53/02
                                                            55/522
(Continued)

FOREIGN PATENT DOCUMENTS

CN    1956770 A    5/2007
CN    102548900 A    7/2012
(Continued)

OTHER PUBLICATIONS

Chinese Office Action (Application No. 201580012179.5) dated Apr. 28, 2017.
(Continued)

*Primary Examiner* — Chester T Barry
(74) *Attorney, Agent, or Firm* — Burr & Brown, PLLC (57) ABSTRACT

A monolithic separation membrane structure comprises a porous monolithic substrate and a separation membrane. The monolithic substrate includes a first end surface, a second end surface and a plurality of through-holes respectively passing from the first end surface to the second end surface. The separation membrane is formed on an inner surface of the respective plurality of through-holes. The surface roughness Ra of the separation membrane is no more than 1 micrometer and the thickness of the separation membrane is no more than 5 micrometers.

8 Claims, 3 Drawing Sheets

(51) Int. Cl.
  *B01D 69/12* (2006.01)
  *B01D 67/00* (2006.01)
  *B01D 71/02* (2006.01)
  *B01D 46/24* (2006.01)
  *B01D 53/22* (2006.01)
(52) U.S. Cl.
  CPC ......... *B01D 67/0046* (2013.01); *B01D 69/02* (2013.01); *B01D 69/12* (2013.01); *B01D 71/021* (2013.01); *B01D 71/025* (2013.01); *B01D 71/027* (2013.01); *B01D 71/028* (2013.01); *B01D 71/024* (2013.01); *B01D 2325/04* (2013.01); *B01D 2325/06* (2013.01)

(56) References Cited

U.S. PATENT DOCUMENTS

| | | | |
|---|---|---|---|
| 2010/0193438 A1* | 8/2010 | Isomura | B01D 67/0048 210/651 |
| 2011/0300335 A1 | 12/2011 | Clinton et al. | |
| 2012/0159938 A1 | 6/2012 | Fekety et al. | |
| 2012/0183759 A1 | 7/2012 | Nakamura et al. | |
| 2014/0048482 A1* | 2/2014 | Ichikawa | B01D 63/066 210/636 |
| 2014/0208707 A1 | 7/2014 | Teranishi et al. | |
| 2015/0044130 A1* | 2/2015 | Tang | B01D 63/00 423/648.1 |

FOREIGN PATENT DOCUMENTS

| | | |
|---|---|---|
| EP | 1 723 999 A1 | 11/2006 |
| JP | 03-284328 A1 | 12/1991 |
| JP | 2007-254222 A1 | 10/2007 |
| JP | 2007-284303 A1 | 11/2007 |
| JP | 2008-239353 A1 | 10/2008 |
| JP | 2012-066241 A1 | 4/2012 |
| JP | 2013-529132 A1 | 7/2013 |
| WO | WO-9311087 A1 * | 6/1993 ............ B01D 29/31 |
| WO | 2011/038059 A1 | 3/2011 |
| WO | 2011/040205 A1 | 4/2011 |
| WO | 2013/054794 A1 | 4/2013 |

OTHER PUBLICATIONS

Extended European Search Report (Application No. 15769832.5) dated Oct. 23, 2017.
International Search Report and Written Opinion (Application No. PCT/JP2015/054012) dated May 12, 2015.
English translation of International Preliminary Report on Patentability (Chapter I) (Application No. PCT/JP2015/054012) dated Oct. 13, 2016.
European Office Action (Application No. 15 769 832.5) dated Nov. 13, 2018.

* cited by examiner

MONOLITHIC SEPARATION MEMBRANE STRUCTURE AND METHOD FOR PRODUCING MONOLITHIC SEPARATION MEMBRANE STRUCTURE

TECHNICAL FIELD

The present invention relates to a monolithic separation membrane structure, and to a method of producing the monolithic separation membrane structure.

BACKGROUND ART

A monolithic separation membrane structure is known to typically comprise a monolithic substrate that includes a plurality of through-holes, and a separation membrane that is formed an inner surface of the through-holes (see PCT Laid Open Application 2013/054794).

The separation membrane can be configured from an inorganic material such as a zeolite, carbon, silica, or the like, or a metallic material such as palladium, or the like.

SUMMARY OF THE INVENTION

Technical Problem

However, there is the problem that cracks tend to be produced in the separation membrane when forming the separation membrane by a heat processing step.

The investigations conducted by the present inventors have resulted in the new insight that the thickness and surface roughness of the separation membrane has an effect on crack production.

The present invention is proposed in light of the situation described above, and has the purpose of providing a monolithic separation membrane structure and a method of producing the monolithic separation membrane structure to thereby enable suppression of cracking in the separation membrane.

Solution to Problem

The monolithic separation membrane structure of the present invention includes a porous monolithic substrate and a separation membrane. The monolithic substrate includes a first end surface, a second end surface and a plurality of through-holes respectively passing from the first end surface to the second end surface. The separation membrane is formed on the inner surface of the respective plurality of through-holes. The surface roughness Ra of the separation membrane is no more than 1 micrometer. The thickness of the separation membrane is no more than 5 micrometers.

Effect of Invention

The present invention enables the provision of a monolithic separation membrane structure and a method of producing the monolithic separation membrane structure that enables suppression of cracking in the separation membrane.

DESCRIPTION OF EMBODIMENTS

Next, the embodiments of the present invention will be described making reference to the figures. In the description of the figures below, the same or similar portions are denoted by the same or similar reference numerals. However, the figures are merely illustrative and the ratio of respective dimensions or the like may differ from the actual dimensions. Therefore, the actual dimensions or the like should be determined by reference to the following description. Furthermore, it goes without saying that the ratios or the relations of dimensions used in respective figures may be different.

In the following embodiments, the term "monolithic" is a concept that denotes a shape that includes a plurality of through-holes formed in a longitudinal direction, and includes a honeycomb shape.

Structure of Monolithic Separation Membrane Structure 100

Figure 1:
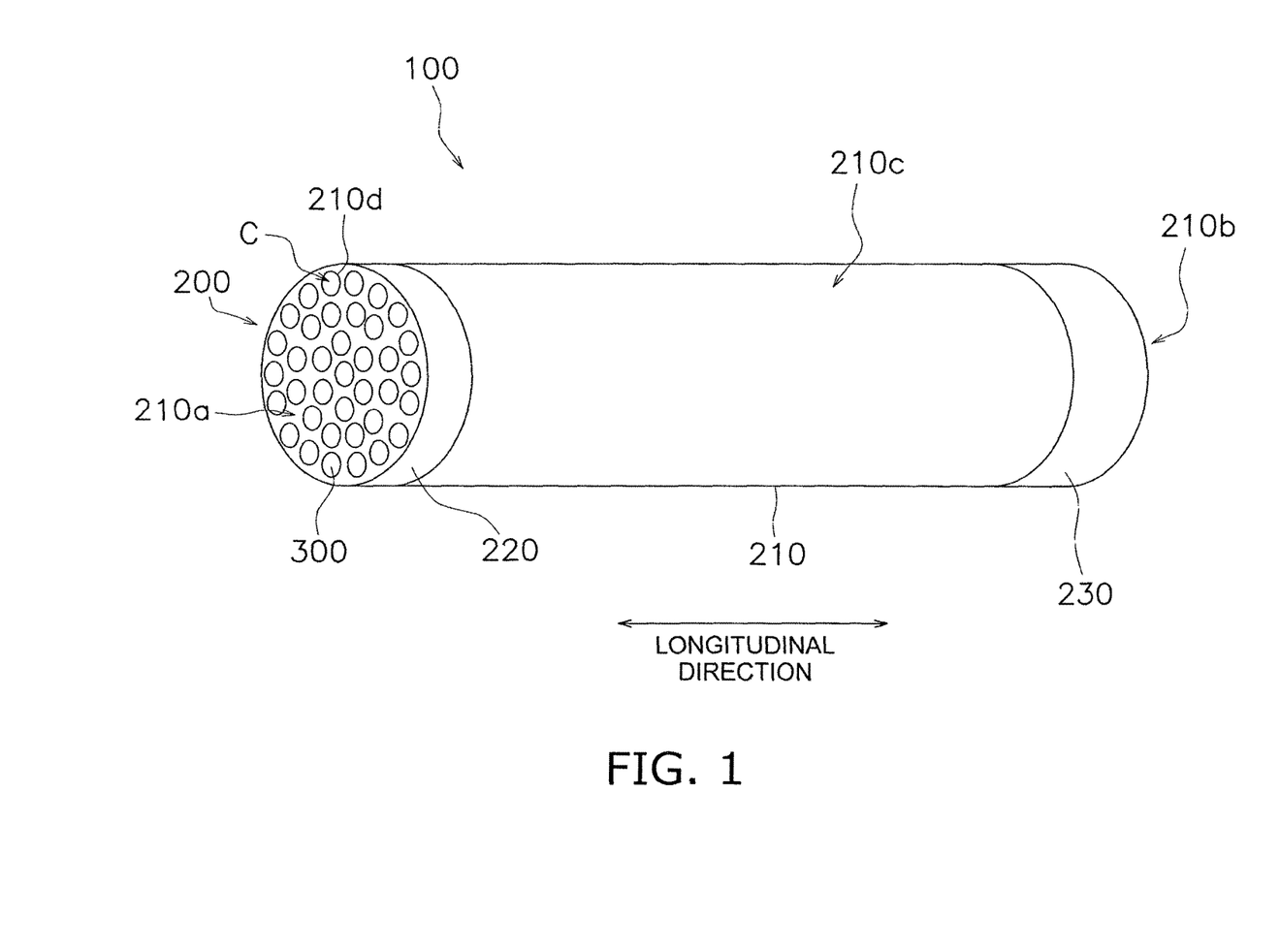
FIG. 1 is a perspective view illustrating a monolithic separation membrane structure.
Figure 2:
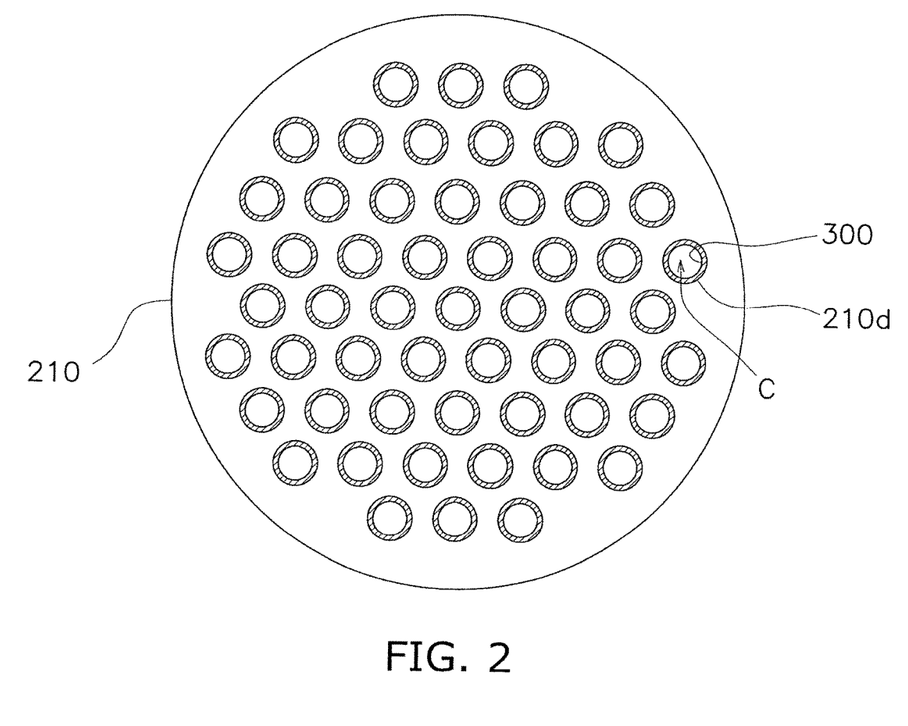
FIG. 2 illustrates a sectional view of a monolithic separation membrane structure.

FIG. 1 is a perspective view illustrating a monolithic separation membrane structure 10. FIG. 2 illustrates a sectional view of a monolithic separation membrane structure 100.

The monolithic separation membrane structure 100 includes a monolithic substrate 200 and a separation membrane 300.

The monolithic substrate 200 includes a base material body 210, a first seal portion 220, and a second seal portion 230.

The base material body 210 is configured by a porous material. The base material body 210 is formed as a circular cylinder. The length of the base material body 210 in a longitudinal direction is 150 to 2000 mm, and the diameter of the base material body 210 in the short width direction is 30 to 220 mm. However there is no limitation in this regard. The base material body 210 has a first end surface 210a, a second end surface 210b, a side surface 210c, and a plurality of through-holes 210d. The first end surface 210a is provided opposite to the second end surface 210b. The side surface 210c is connected to the first end surface 210a and the second end surface 210b. The through-holes 210d pass through the base material body 210 from the first end surface 210a to the second end surface 210b. The sectional shape of through-holes 210d is circular. The diameter of the through-holes 210d is 1 to 5 mm, however there is no limitation in this regard.

The first seal portion 220 covers the entirety of the first end surface 210a and a portion of the side surface 210c. The first seal portion 220 inhibits direct inflow, from the first end surface 210a to the base material body 210, of the mixed fluid that flows in cells C. The first seal portion 220 is formed so that a barrier is not formed in relation to the input port for the plurality of cells C. The material that configures the first seal portion 220 includes use of glass, metal, or the like. However, glass is preferred in light of adaptability with the thermal expansion coefficient of the base material body 210.

The second seal portion 230 covers the entirety of the second end surface 210b and a portion of the side surface 210c. The second seal portion 230 inhibits inflow, from the second end surface 210b to the base material body 210, of the mixed fluid that flows in the through-holes 210d. The second seal portion 230 is formed so that a barrier is not formed in relation to the input port for the cells C. The second seal portion 230 may be configured by use of the same material as the first seal portion 220.

The separation membrane 300 is formed on an inner surface of the plurality of through-holes 210d. The separation membrane 300 is formed as a cylindrical tube. Cells C are formed on an inner side of the separation membrane 300 to enable flow of a mixed fluid. The separation membrane 300 may be configured as a gas separation membrane, a PV (pervaporation) membrane, or a VP (vapor permeation) membrane.

Figure 3:
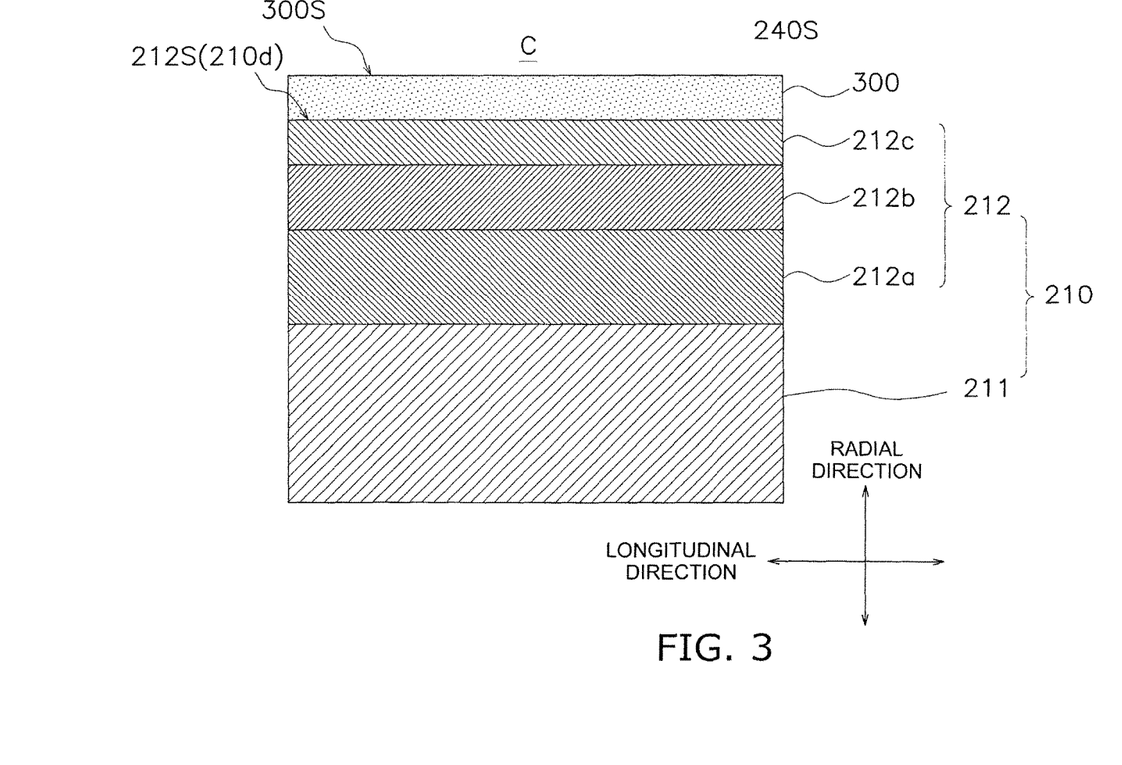
FIG. 3 illustrates a partial enlargement of FIG. 2.

FIG. 3 illustrates a partial enlargement of FIG. 2. The base material body 210 includes an extrusion material layer 211 and a support layer 212.

The extrusion material layer 211 exhibits a monolithic structure. The extrusion material layer 211 is formed from a porous material. The porous material that forms the extrusion material layer 211 includes use of a ceramic, metal, resin, or the like. In particular, use of a porous ceramic is preferred. The aggregate particles used in relation to the porous ceramic material include alumina ($Al_2O_3$), titania ($TiO_2$), mullite ($Al_2O_3 \cdot SiO_2$), potsherd, and cordierite ($Mg_2Al_4Si_5O_{18}$), and in particular, alumina is preferred in light of ease of availability, formation of a stable clay, and anticorrosive properties. The extrusion material layer 211 may include an inorganic binder in addition to the porous material. The inorganic binder may include at least one of titania, mullite, sinterable alumina, silica, glass frits, clay minerals, and sinterable cordierite. The porosity of the extrusion material layer 211 may be configured to 25% to 50%. The average pore diameter of the extrusion material layer 211 may be 5 micrometers to 25 micrometers. The average particle diameter of porous material that configures the extrusion material layer 211 may be 10 micrometers to 100 micrometers.

In the present embodiment, the term "average particle diameter" denotes the value of the arithmetic mean for the maximum diameter of 30 measured particles that are measured by cross sectional micro-structure observation by use of a scanning electron microscope (SEM).

The support layer 212 is disposed between the extrusion material layer 211 and the separation membrane 300. The support layer 212 supports the separation membrane 300. The support layer includes a first intermediate layer 212a, a second intermediate layer 212b and a surface layer 212c. The first intermediate layer 212a, the second intermediate layer 212b and the surface layer 212c are laminated in sequence onto the extrusion material layer 211 in a direction perpendicular to the central axis of the cell C (referred to below as "radial direction").

The first intermediate layer 212a is disposed on the inner surface of the extrusion material layer 211. The first intermediate layer 212a can be configured by a porous material. The porous material used to configure the first intermediate layer 212a may be the porous material used to configure the extrusion material layer 211. The porous material used to configure the first intermediate layer 212a may be the same or different from the type of porous material used to configure the extrusion material layer 211. The first intermediate layer 212a may contain the inorganic binder that is used in the extrusion material layer 211. The inorganic binder used in the first intermediate layer 212a may be the same type or a different type to that used in the extrusion material layer 211. As described below, the first intermediate layer 212a is prepared by a filtration method using a slurry that contains an organic binder (solvent).

The porosity of the first intermediate layer 212a may be configured as 15% to 70%. The average pore diameter of the first intermediate layer 212a is smaller than the average pore diameter of the extrusion material layer 211. The average pore diameter of the first intermediate layer 212a may be configured as 0.005 micrometers to 2 micrometers. The average pore diameter of the porous material used to configure the first intermediate layer 212a may be smaller than the average pore diameter of the porous material used to configure the extrusion material layer 211. The average particle diameter of the porous material that configures the first intermediate layer 212a may be configured as 0.1 micrometers to 5 micrometers. The thickness of the first intermediate layer 212a in a radial direction can be configured as 50 micrometers to 300 micrometers.

The second intermediate layer 212b is disposed on the inner surface of the first intermediate layer 212a. The second intermediate layer 212b can be configured by a porous material. The porous material used to configure the second intermediate layer 212b may be the porous material used to configure the extrusion material layer 211. However it is preferred that the aggregate particles are alumina. The second intermediate layer 212b may contain the inorganic binder that is used in the extrusion material layer 211. As described below, the second intermediate layer 212b is prepared by a filtration method using a slurry that contains an organic binder (solvent).

The porosity of the second intermediate layer 212b may be configured as 15% to 70%. The average pore diameter of the second intermediate layer 212b is smaller than the average pore diameter of the first intermediate layer 212a. The average pore diameter of the second intermediate layer 212b may be configured as 0.001 micrometers to 0.5 micrometers. The average pore diameter of the porous material used to configure the second intermediate layer 212b may be smaller than the average pore diameter of the porous material used to configure the first intermediate layer 212a. The average particle diameter of the porous material that configures the second intermediate layer 212b may be configured as 0.05 micrometers to 1.0 micrometers. When the second intermediate layer 212b contains alumina, the average particle diameter of the alumina is preferably 0.4 micrometers to 3 micrometers, and no more than 1 micrometer. The thickness of the second intermediate layer 212b in a radial direction can be configured as 2 micrometers to 80 micrometers. When the second intermediate layer 212b contains alumina, the thickness of the second intermediate layer 212b is preferably 5 micrometers to 80 micrometers, and more preferably 10 micrometers to 40 micrometers.

The surface layer 212c is disposed on the inner surface of the second intermediate layer 212b. The surface layer 212c is the innermost layer of the support layer 212 for forming of the separation membrane 300. The surface layer 212c is formed from a porous material. Although the porous material for the surface layer 212c may be the porous material that is used in the extrusion material layer 211, it is preferred that at least one of alumina or titania is included as an aggregate particle. The surface layer 212c may contain the inorganic binder used in the extrusion material layer 211. The slurry used in the surface layer 212c is preferably pulverized by use of a ball mill, bead mill or the like. The constituent material for the surface layer 212c may be the same or different from the constituent material of the second intermediate layer 212b. When the constituent material is the same as that used in the second intermediate layer 212b, the surface layer 212c and the second intermediate layer 212b may be formed in an integrated configuration without an interface between the two components. As described below, the surface layer 212c is prepared by a flow down method using a slurry that does not contain an organic binder.

The porosity of the surface layer 212c may be configured as 15% to 70%. The average pore diameter of the surface layer 212c may be smaller than the average pore diameter of the second intermediate layer 212b. The average pore diameter of the surface layer 212c may be configured as 0.001 micrometers to 0.5 micrometers. The average particle diameter of the porous material that configures the surface layer 212c may be configured as 0.01 micrometers to 0.5 micrometers. When the surface layer 212c contains alumina, the average particle diameter of the alumina is preferably 0.03 micrometers to 1 micrometers, and more preferably no more than 0.5 micrometers. The thickness of the surface layer 212c in a radial direction can be configured as 1 micrometer to 10 micrometers.

The surface layer 212c includes an inner surface 212S that makes contact with the separation membrane 300. The inner surface 212S is the innermost surface of the support layer 212. The surface roughness Ra of the inner surface 212S is preferably no more than 1.0 micrometer, and more preferably no more than 0.7 micrometers. The surface roughness Ra of the inner surface 212S can be measured using a surface curve within a range of 25 micrometers obtained using SEM.

The separation membrane 300 is formed on an inner surface 212S of the surface layer 212c. The separation membrane 300 is preferably configured from an inorganic material, metal or the like. The inorganic material for the separation membrane 300 includes zeolite, carbon, silica, or the like. The metal material used in the separation membrane 300 includes palladium, or the like. When the separation membrane 300 is configured as a zeolite membrane, a zeolite having a crystal structure such as LTA, MFI, MOR, FER, FAU, DDR, CHA, BEA, or the like can be used. When the separation membrane 300 is configured as a DDR type zeolite membrane, suitable use is enabled as a gas separation membrane for selective removal of carbon dioxide.

The thickness of the separation membrane 300 in a radial direction is preferably no more than 5 micrometers, and more preferably no more than 1.1 micrometers. The thickness of the separation membrane 300 may be a measurement value obtained by use an electron scanning microscope at one cross sectional position, or may be the arithmetic mean for the measurement values obtained by an electron scanning microscope at a plurality of cross sectional positions.

The separation membrane 300 includes a surface 300S. The surface roughness Ra of the surface 300S is preferably no more than 1.0 micrometers, and more preferably no more than 0.61 micrometers. The surface roughness Ra of the surface 300S may be measured using a contact measurement device in accordance with the measurement method for the arithmetic mean roughness Ra prescribed in JIS B0601.

Method of Manufacturing Monolithic Separation Membrane Structure 100

Firstly, a green body for the extrusion material layer 211 that includes a plurality of though-holes is formed is formed using clay that includes a porous material. The method of forming the green body for the base material body 210 includes use of an extrusion molding method using a vacuum extrusion molding device, in addition to a press molding method or a slip cast method.

Next, the green body for the extrusion material layer 211 is fired (for example, 1000 degrees C. to 1550 degrees C., 1 hour to 100 hours) to thereby form the extrusion material layer 211.

Next, a first intermediate layer slurry is prepared by adding an organic binder, a sintering additive, a pH adjusting agent and a surface active agent, or the like to the porous material for the first intermediate layer 212a.

A green body for the first intermediate layer 212a is formed by a filtration method using the first intermediate layer slurry. More specifically, the first intermediate layer slurry is supplied to the through-holes of the extrusion material layer 211, and drawn by use of a pump from an outer peripheral surface of the extrusion material layer 211 to thereby form a green body for the first intermediate layer 212a on the inner surface of the extrusion material layer 211.

Thereafter, the green body for the first intermediate layer 212a is fired (for example, 900 degrees C. to 1450 degrees C., 1 hour to 100 hours) to thereby form the first intermediate layer 212a.

Next, a second intermediate layer slurry is prepared by adding an organic binder, a sintering additive, a pH adjusting agent and a surface active agent, or the like to the porous material for the second intermediate layer 212b.

Next, a green body for the second intermediate layer 212b is formed by a filtration method using the second intermediate layer slurry. More specifically, the second intermediate layer slurry is supplied to an inner portion of the first intermediate layer 212a, and drawn by use of a pump from an outer peripheral surface of the extrusion material layer 211 to thereby form a green body for the second intermediate layer 212b on the inner surface of the first intermediate layer 212a.

Thereafter, the green body for the second intermediate layer 212b is fired (for example, 900 degrees C. to 1450 degrees C., 1 hour to 72 hours) to thereby form the second intermediate layer 212b.

Next, a surface layer slurry that does not contain an organic binder is prepared by pulverizing a sintering additive, a pH adjusting agent and a surface active agent, or the like to the porous material for the surface layer 212c by use of a ball mill. In the present embodiment, the feature of "does not contain an organic binder" denotes the concept that an organic binder is substantially not contained, in addition to a configuration in which an organic binder is not at all contained. More specifically, the content ratio of the organic binder included in the surface layer slurry is preferably no more than 1 wt %, and more preferably no more than 0.5 wt %.

Next, a green body for the surface layer 212c is formed by a flow down method using the surface layer slurry. More specifically, the green body for the surface layer 212c is formed on the inner surface of the second intermediately layer 212b by allowing the surface layer slurry to flow by its own weight in an inner portion of the second intermediate layer 212b. The surface of the green body of the surface layer 212c that is formed by the flow down method is formed more smoothly when compared to use of a filtration method.

Thereafter, the green body for the surface layer 212c is fired (for example, 600 degrees C. to 1450 degrees C., 1 hour to 72 hours) to thereby form the surface layer 212c. The surface roughness Ra of the surface layer 212c is preferably no more than 1.0 micrometer, and more preferably no more than 0.7 micrometers. The surface roughness Ra of the surface layer 212c can be adjusted by varying the conditions for the flow down method in the preceding step. For example, the surface roughness may be varied by varying the time to pulverize the surface layer slurry by use of a ball mill, bead mill, or the like. The surface roughness Ra of the surface layer 212c may be measured using a surface curve within a range of 25 micrometers obtained using SEM.

Next, the separation membrane 300 having a thickness of no more than 5.0 micrometers is formed on the inner surface 212S of the surface layer 212c. The method of forming the separation membrane 300 may be a suitable method adapted to the type of separation membrane 300. The surface roughness Ra of the surface layer 212c is adjusted to no more than 1.0 micrometers, and therefore the surface roughness Ra of the separation membrane 300 can be easily configured to be no more than 1.0 micrometer. The surface roughness Ra of the separation membrane 300 may be measured using a contact measurement device in accordance with the measurement method for the arithmetic mean roughness Ra prescribed in JIS B0601.

It is generally the case that a heating step is included in the formation steps for the separation membrane 300. For example, the formation steps for a DDR type zeolite membrane include a seeding step using a flow down method, a hydrothermal synthesis step for a sol, and a heating step for removing a structure directing agent (400 to 800 degrees C., 1 hour to 200 hours). The membrane thickness of the DDR type zeolite membrane can be adjusted by varying the synthesis time in the hydrothermal synthesis step for the sol.

The formation steps for a silica membrane include a deposition step for the silica sol solution, and a firing step (350 to 600 degrees C., 1 to 100 hours). The membrane thickness of the silica membrane can be adjusted by varying the deposition method of the silica sol solution (for example, flow down method, dip method, spin coating method, or the like), or the repetition number of the above steps.

The formation steps for a carbon membrane include a coating step for the precursor solution, a thermal processing step (150 to 250 degrees C., 1 to 50 hours), and a carbonization step in a non-oxidizing atmosphere (500 to 600 degrees C., 1 to 50 hours). The membrane thickness of the carbon membrane can be adjusted by varying the deposition method of the precursor solution (for example, flow down method, dip method, spin coating method, or the like), or the repetition number of the coating step for the precursor solution.

Operation and Effect

The monolithic separation membrane structure 100 includes the monolithic substrate 200 and the separation membrane 300. The surface roughness Ra of the separation membrane 300 is no more than 1.0 micrometer. Therefore since the thickness of the separation membrane 300 is substantially uniform, it is possible to suppress a concentration of thermal stress in a portion of the separation membrane 300 during the heating step. Furthermore, the thickness of the separation membrane 300 is no more than 5.0 micrometers. Therefore the production of a thermal stress resulting from an excessive thickness in the separation membrane 300 can be suppressed. The above features enable suppression of crack production or detachment of the separation membrane 300.

The method of manufacturing the monolithic separation membrane structure 100 according to the present embodiment includes a step of forming the first and the second intermediate layers 212a, 212b by a filtration method using a slurry that contains an organic binder, a step of forming a surface layer 212c by a flow down method using a slurry that does not contain an organic binder, and a step of forming a separation membrane 300 having a thickness of no more than 5.0 micrometers on an inner surface of the surface layer 212c. In this manner, since the surface layer 212c is formed by a flow down method using a slurry that does not contain an organic binder, the surface roughness Ra of the surface layer 212c can be suppressed to no more than 1.0 micrometer. As a result, the membrane forming characteristics of the separation membrane 300 can be enhanced, and the surface roughness Ra of the separation membrane can be suppressed to no more than 1.0 micrometer while maintaining the thickness of the separation membrane 300 to no more than 5.0 micrometers.

Other Embodiments

Although an embodiment of the present invention has been described, the present invention is not limited to the above embodiment, and various modifications are possible within a scope that does not depart from the spirit of the invention.

(A) In the above embodiment, although the support layer 212 is configured to include a first intermediate layer 212a, a second intermediate layer 212b and a surface layer 212c, a configuration is possible that includes only one of the first intermediate layer 212a and the second intermediate layer 212b.

(B) In the above embodiment, although the base material body 210 was formed in a cylindrical shape, a polygonal cylinder or ovoid shape is also possible.

(C) In the above embodiment, although the sectional shape of the through-holes 210d is circular, a polygonal or oval shape is also possible.

(D) In the above embodiment, the first and second main seal portions 220, 230 respectively cover a portion of the side surface 210c. However the side surface 210c may not be covered.

EXAMPLES

The examples of the present invention will be described below. However, the present invention is not thereby limited to the following examples.

Preparation of Samples No. 1 to No. 12

A Samples No. 1 to No. 12 were prepared as described below.

Firstly, 20 parts by mass of an inorganic binder was added to 100 parts by mass of alumina particles having an average particle diameter of 50 micrometers, then water, a dispersing agent and a thickener are added, and the mixture was kneaded to prepare a clay.

Next, a green body for the extrusion material layer that has a plurality of through-holes was prepared by extrusion molding of the prepared clay.

Next, the green body for the extrusion material layer was fired (1250 degrees C., 1 hour). The average particle diameter was calculated as the arithmetic average of the respective maximum diameters of 30 particles by SEM observation of the sectional surface of the extrusion material layer. The average particle diameter of the extrusion material layer is shown in Table 1.

Next, a support layer was formed by a configuration including a first intermediate layer, a second intermediate layer and a surface layer. Firstly, PVA (organic binder) was added to alumina and titania to thereby prepare a slurry for the first intermediate layer. A green body for the first intermediate layer was formed on an inner surface of the through-holes by a filtration method using the first intermediate layer slurry. Then, the green body for the first intermediate layer was fired (1250 degrees C., 2 hours) to form the first intermediate layer.

Then, PVA (organic binder) was added to alumina to thereby prepare a slurry for the second intermediate layer. A green body for the second intermediate layer was formed on an inner surface of the first intermediate layer by a filtration method using the second intermediate layer slurry. Next, the green body for the second intermediate layer was fired (1250 degrees C., 2 hours) to form the second intermediate layer.

Next, a slurry for the surface layer was prepared without addition of an organic binder to the materials shown in Table 1 (alumina in Samples No. 1 to 9, 11 and 12, and titania in Sample No. 10). A green body for the surface layer was formed on an inner surface of the second intermediate layer by a flow down method using the slurry for the surface layer. The surface roughness of the inner surface of the surface layer could be adjusted by adjusting the average particle diameter in each sample as a result of varying the time used to pulverize the surface layer slurry with a ball mill.

A surface layer was formed by firing the green body for the surface layer (1250 degrees C. and one hour in Sample Nos. 1 to 9, 11 and 12, and 950 degrees C., one hour in Sample No. 10). In Sample Nos. 1 to 12, the surface layer of the support layer was the innermost layer for formation of the separation membrane. The average particle diameter was calculated as the arithmetic average of the respective maximum diameters of 30 particles by SEM observation of the sectional surface of the surface layer. The average particle diameter of the surface layer (innermost layer of the support layer) is summarized in Table 1.

Next, a separation membrane was formed on an inner surface of the surface layer. In Sample Nos. 1 to 10, the separation membrane was formed as a DDR type zeolite membrane. In Sample Nos. 1 to 10, the thickness of the DDR type zeolite membrane was varied in each sample as shown in Table 1 by varying the hydrothermal synthesis time for the sol. In Sample No. 11, a carbon membrane was formed as the separation membrane as shown below.

Firstly, a precursor solution was prepared by mixing and dissolving a phenol resin in an organic solvent. Then, a dip coating method was used to form a film of the precursor solution on an inner surface of the surface layer. Then, a polyimide resin as a precursor was arranged by thermal processing the surface of the film-forming precursor solution (300 degrees C., one hour). Then, the polyimide resin was thermally processed (non-oxidizing atmosphere, 600 degrees C., 5 hours) to form a carbon membrane. A silica membrane was formed as the separation membrane in Sample No. 12. A precursor solution (silica sol solution) was obtained by using ethanol to dilute a sol solution in which tetraethoxysilane had been hydrolyzed in the presence of nitric acid, and was caused to flow into a cell, and dried at 80 degrees C. to be thereby deposited on an inner surface of the surface layer. Thereafter, the temperature was increased by 100 degrees C./hour, and after maintaining a temperature of 500 degrees C. for one hour, the temperature was decreased by 100 degrees C./hour. The operation of inflow, drying, temperature increase and temperature decrease was repeated 3 to 5 times to thereby form a silica membrane.

Preparation of Sample Nos. 13 to 20

Sample Nos. 13 to 20 were prepared by the same steps as Sample Nos. 1 to 12 as described above. However in Sample Nos. 13 to 20, a surface layer was not formed in the support layer. Therefore in Sample Nos. 13 to 20, the second intermediate layer of the support layer was the innermost layer for forming the separation membrane. The average particle diameter, and membrane type and average membrane thickness of the separation membrane and materials of the second intermediate layer (innermost layer of the support layer) are summarized in Table 1.

Surface Roughness Ra of Innermost Layer of Support Layer

In Sample Nos. 1 to 20, the surface roughness Ra of the inner surface that makes contact with the separation membrane was measured in the range of 25 micrometers by SEM observation of a sectional surface of the innermost layer of the support layer. The measurement results are shown in Table 1.

Surface Roughness Ra of Separation Layer

The surface roughness of the separation membrane in Sample Nos. 1 to 20 was measured by a contact measurement device in accordance with JIS standard B0601. The measurement results are shown in Table 1.

Separation Performance of Separation Membrane

A separation coefficient was calculated for the DDR type zeolite membrane according to Sample Nos. 1 to 10, and 13 to 18. More specifically, a mixed gas (volume ratio of each gas is 50:50, partial pressure of each gas is 0.2 MPa) of carbon dioxide ($CO_2$) and methane ($CH_4$) was introduced into a cell, and the gas after filtration by the DDR type zeolite membrane is recovered. Then a gas chromatograph was used to perform component analysis of the recovered gas and thereby calculate a separation coefficient by use of the formula of "separation coefficient alpha=(permeation $CO_2$ concentration/permeation $CH_4$ concentration)/(supplied $CO_2$ concentration/supplied $CH_4$ concentration)".

A separation coefficient for the carbon membrane in Sample Nos. 11 and 19 and the silica membrane in Sample Nos. 12 and 20 was calculated. More specifically, a mixed fluid of water and ethanol was introduced into a cell, and the liquid that has passed through the carbon membrane or the silica membrane was recovered. Then a gas chromatograph was used to perform component analysis of the recovered fluid. A separation coefficient was calculated by use of the formula of "separation coefficient alpha=(permeation water concentration (mass %)/permeation ethanol concentration (mass %))/(supplied water concentration (mass %)/supplied ethanol concentration(mass %))". The calculated separation coefficients are shown in Table 1. It is observed that the separation performance of the separation membrane increases as the value of the separation coefficient increases.

Measurement of Defect Amount based on Gas Permeation Amount

A gas having a molecular diameter greater than or equal to the pore diameter of the separation membrane was introduced into a cell to investigate a defect in the separation membrane with reference to a gas permeation amount. More specifically, methane tetrafluoride was supplied at 0.1 MPa to the cells in Sample Nos. 1 to 10 and 13 to 18. A permeation amount for methane tetrafluoride in the DDR type zeolite membrane was calculated based on the time taken for 0.5 cc of methane tetrafluoride to leak from the cell.

Sulfur hexafluoride is supplied at 0.1 MPa to the cells in Sample Nos. 11, 12, 19 and 20, and a permeation amount for sulfur hexafluoride in a carbon membrane or silica membrane was calculated based on the time taken for 0.5 cc of sulfur hexafluoride to leak from the cell. The calculated permeation amounts are shown in Table 1. A low value for the permeation amount indicates a low number of defects in the separation membrane.

Defect Observation by Dye Fluid

Sample Nos. 1 to 20 were immersed for 1 to 30 seconds by introduction into a cell of a solution containing 0.1% rhodamine in ethanol, followed by washing with water. Thereafter, production of cracks in the dried separation membrane was confirmed by visual inspection. The confirmation results are shown in Table 1.

TABLE 1

| Sample No. | Average Particle Diameter of Extrusion Material (μm) | Formation Method | Innermost Layer of Support Layer Average Particle Diameter (μm) | Innermost Layer of Support Layer Surface Roughness Ra (μm) | Material | Separation Membrane Type | Separation Membrane Surface Roughness Ra (μm) | Separation Membrane Average Membrane Thickness (μm) | Separation Coefficient of Separation Membrane | Permeation Amount of Separation Membrane (L/min · m²/kPa) | Cracks in Separation Membrane |
|---|---|---|---|---|---|---|---|---|---|---|---|
| 1 | 50 | flow down method | 0.4 | 0.80 | Alumina | DDR-type zeolite membrane | 0.60 | 4.8 | 120 | no more than 0.0001 | No |
| 2 | 50 | flow down method | 0.5 | 1.00 | Alumina | DDR-type zeolite membrane | 0.97 | 2.2 | 190 | no more than 0.0001 | No |
| 3 | 50 | flow down method | 0.7 | 1.00 | Alumina | DDR-type zeolite membrane | 0.99 | 1.0 | 155 | no more than 0.0001 | No |
| 4 | 50 | flow down method | 0.4 | 1.00 | Alumina | DDR-type zeolite membrane | 0.80 | 3.6 | 202 | no more than 0.0001 | No |
| 5 | 50 | flow down method | 0.4 | 0.70 | Alumina | DDR-type zeolite membrane | 0.61 | 0.8 | 351 | no more than 0.0001 | No |
| 6 | 50 | flow down method | 0.3 | 0.47 | Alumina | DDR-type zeolite membrane | 0.49 | 1.1 | 358 | no more than 0.0001 | No |
| 7 | 50 | flow down method | 0.3 | 0.39 | Alumina | DDR-type zeolite membrane | 0.38 | 0.7 | 380 | no more than 0.0001 | No |
| 8 | 50 | flow down method | 0.4 | 0.81 | Alumina | DDR-type zeolite membrane | 0.79 | 5.3 | 25 | 0.144 | Yes |
| 9 | 50 | flow down method | 0.03 | 0.25 | Alumina | DDR-type zeolite membrane | 0.24 | 0.6 | 387 | no more than 0.0001 | No |
| 10 | 50 | flow down method | 0.1 | 0.34 | Titania | DDR-type zeolite membrane | 0.31 | 0.5 | 388 | no more than 0.0001 | No |
| 11 | 50 | flow down method | 0.4 | 0.71 | Alumina | Carbon membrane | 0.55 | 1.0 | 60 | 0.0008 | No |
| 12 | 50 | flow down method | 0.03 | 0.25 | Alumina | Silica membrane | 0.20 | 1 | 203 | 0.4 | No |
| 13 | 50 | filtration method | 0.4 | 1.50 | Alumina | DDR-type zeolite membrane | 1.11 | 5.5 | 9 | 1.52 | Yes |
| 14 | 50 | filtration method | 0.4 | 1.11 | Alumina | DDR-type zeolite membrane | 1.03 | 2.7 | 86 | 0.0075 | Yes |
| 15 | 50 | filtration method | 0.5 | 1.40 | Alumina | DDR-type zeolite membrane | 1.17 | 3.4 | 61 | 0.0197 | Yes |
| 16 | 50 | filtration method | 0.7 | 1.25 | Alumina | DDR-type zeolite membrane | 1.20 | 1.9 | 30 | 0.120 | Yes |
| 17 | 50 | filtration method | 0.1 | 1.29 | Titania | DDR-type zeolite membrane | 1.20 | 3.1 | 52 | 0.099 | Yes |
| 18 | 50 | filtration method | 0.03 | 1.70 | Alumina | DDR-type zeolite membrane | 1.30 | 2.6 | 30 | 0.111 | Yes |
| 19 | 50 | filtration method | 0.4 | 1.60 | Alumina | Carbon membrane | 1.30 | 5.1 | 3.0 | 0.0096 | Yes |
| 20 | 50 | filtration method | 0.03 | 1.80 | Alumina | Silica membrane | 1.70 | 0.1 | 1.0 | 441 | Yes |

As shown in Table 1, crack production in the separation membrane of Sample Nos. 1 to 7, and 9 to 12 was inhibited irrespective of the membrane type, and therefore separation performance was enhanced. These results were obtained by inhibiting the production of localized thermal stress in the separation membrane by a configuration in which the membrane thickness is no more than 5.0 micrometers and the surface roughness Ra of the separation membrane is no more than 1.0 micrometers.

As shown in Table 1, a configuration in which the surface roughness Ra of the separation membrane is no more than 1.0 micrometers is preferably obtained by configuring the surface roughness Ra of the outermost surface layer of the support layer to be no more than 1.0 micrometers, and by preferably forming the outermost surface layer of the support layer by a flow down method.

As shown in Table 1, the separation coefficient is particularly enhanced when the surface roughness Ra of the separation membrane is no more than 0.61 micrometers and the membrane thickness is no more than 1.1 micrometers in Sample Nos. 5 to 7, 9 and 10.

The invention claimed is:

1. A monolithic separation membrane structure comprising:
   a porous monolithic substrate including a first end surface, a second end surface and a plurality of through-holes respectively passing from the first end surface to the second end surface; and
   a separation membrane formed on an inner surface of the respective plurality of through-holes; wherein
   the monolithic substrate includes an extrusion material layer and a support layer disposed between the extrusion material layer and the separation membrane,
   an average particle diameter of a porous material configuring the support layer is smaller than an average particle diameter of a porous material configuring the extrusion material layer,
   a surface roughness Ra of the separation membrane is no more than 1 micrometer, and
   a thickness of the separation membrane is no more than 5 micrometers.

2. The monolithic separation membrane structure according to claim 1, wherein the support layer includes an intermediate layer disposed on the inner surface of the through-hole and a surface layer on an inner surface of the intermediate layer.

3. The monolithic separation membrane structure according to claim 2, wherein the separation membrane is disposed on an inner surface of the surface layer.

4. The monolithic separation membrane structure according to claim 1, wherein a surface roughness Ra of the support layer is no more than 1.0 micrometer.

5. The monolithic separation membrane structure according to claim 1, wherein
   the surface roughness Ra of the separation membrane is no more than 0.61 micrometers, and
   the thickness of the separation membrane is no more than 1.1 micrometers.

6. The monolithic separation membrane structure according to claim 2, wherein
   the surface roughness Ra of the separation membrane is no more than 0.61 micrometers, and
   the thickness of the separation membrane is no more than 1.1 micrometers.

7. A method of producing a monolithic separation membrane structure comprising the steps of:
   forming an extrusion material layer having a plurality of through-holes by use of a clay that contains a porous material;
   forming an intermediate layer on an inner surface of the plurality of through-holes by a filtration method using a slurry that contains a porous material and an organic binder;
   forming a surface layer on an inner surface of the intermediate layer by a flow down method using a slurry that does not contain an organic binder and that contains a porous material; and
   forming a separation membrane having a thickness of no more than 5.0 micrometers on an inner surface of the surface layer.

8. The method of producing a monolithic separation membrane structure according to claim 7, wherein
   the surface roughness Ra of the surface layer in the step of forming the surface layer by a down flow method is no more than 1.0 micrometer, and
   the surface roughness Ra of the separation membrane in the step of forming the separation membrane is no more than 1.0 micrometer.

* * * * *